Patented Mar. 16, 1954

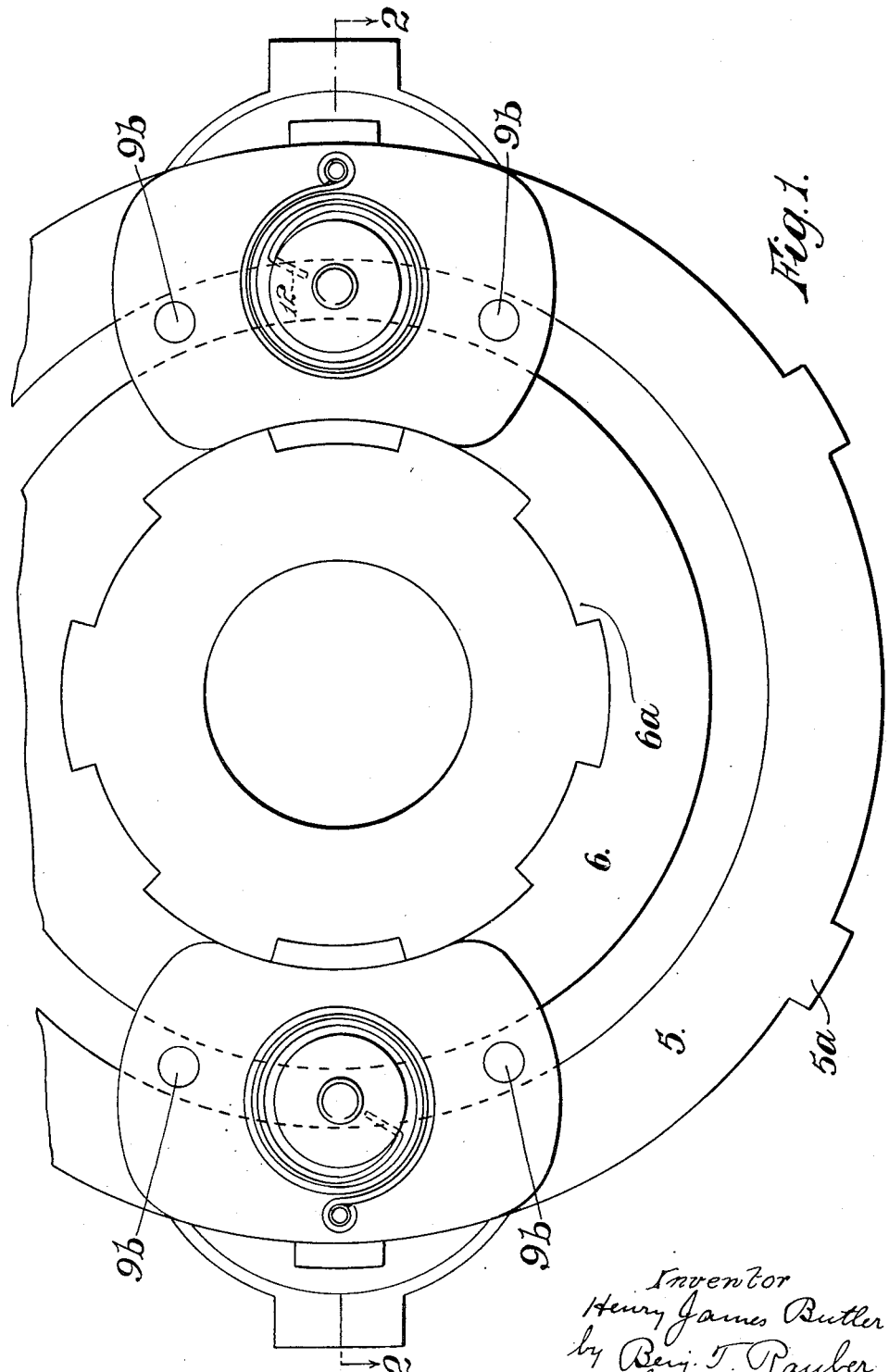

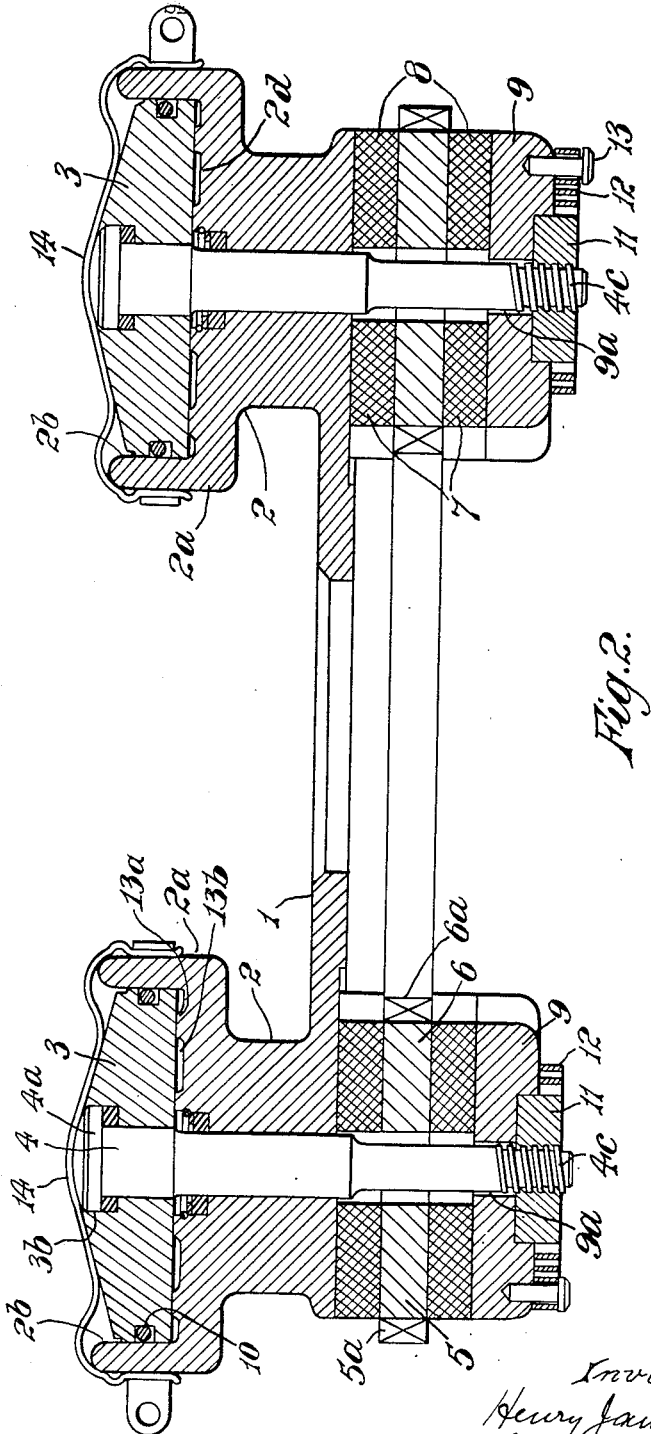

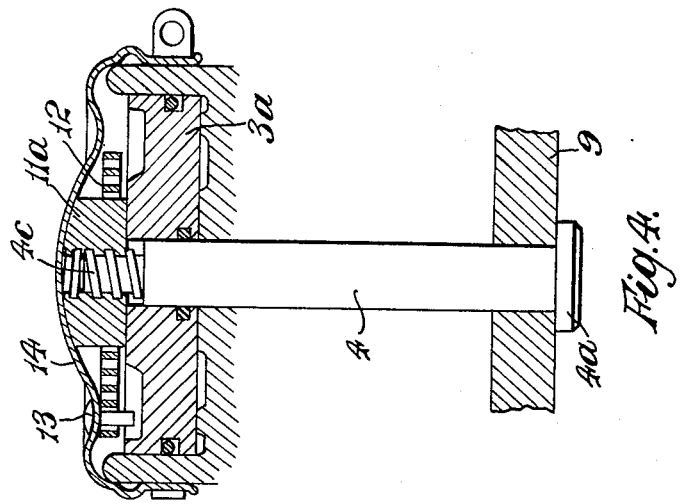
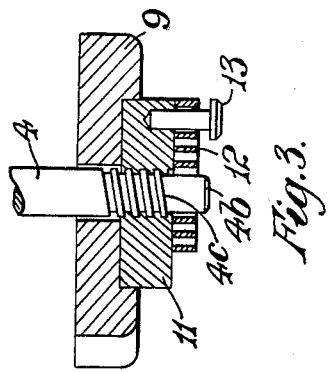
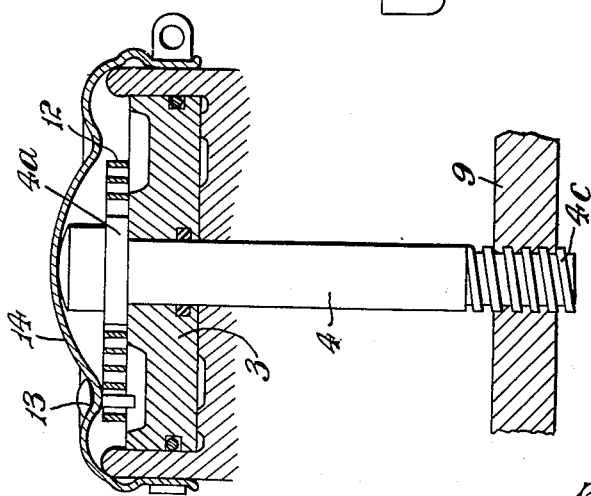

UNITED STATES PATENT OFFICE 2,672,223

SELF-TIGHTENING DISK BRAKE

Henry James Butler, Sutton Coldfield, England, assignor to Dunlop Rubber Company Limited, London County, England, a British company Application August 7, 1947, Serial No. 767,242

Claims priority, application Great Britain September 7, 1946

6 Claims. (Cl. 188—152)

My invention relates to a device for automatically tightening a screwed connection of a fluid operated disc brake.

It is an object of the invention to provide a simply constructed device adapted to operate in such a manner that any slack between the faces of contacting members is taken up automatically.

According to the invention a device for automatically taking up slack due to wear between the faces of contacting members comprises a bolt or like element having a threaded tail portion in engagement with a complementary threaded aperture in a nut or similar element on one of said elements and being free to rotate relative to the other element and a clock-type spring co-axially disposed with respect to said elements having one end attached to said rotatable element and the other end to a fixed point, the method of attachment of said spring being such that it tends to cause said rotatable element to rotate in the direction which reduces the distance between the head of said bolt or like element and the nut or similar element.

The invention is of particular value for automatically taking up slack in fluid-operated disc brakes comprising piston and cylinder mechanism, an annular brake disc or discs and a friction pad or pads in light frictonal contact with the said disc or discs and adapted to be brought into firm frictional contact with said disc or discs by movement of an operating rod associated with said piston.

In order that the invention may be more clearly understood and carried into effect the same will be more particularly described with reference to a number of embodiments which are shown in the accompanying drawings and which illustrate its application to disc brakes comprising a piston and cylinder mechanism, two axially spaced annular brake discs and friction pads adapted to be brought into frictional contact with the brake discs by displacement of an operating rod associated with the piston.

In the drawings:

Fig. 1 shows a plan view of one embodiment of the invention.

Fig. 2 shows a sectional view looking along the line 2—2 of Fig. 1.

Figs. 3, 4, 5 show sectional views of other embodiments of the device.

As can be seen in Figs. 1, 2, the radially spaced annuli 5, 6, are provided with dogs 5a, 6a for engagement with mating recesses formed in the wheel disc (not shown) the arrangement being such that discs 5, 6 whilst being prevented from rotating independently of the wheel are permitted a slight axial movement so that they can be gripped between the pads 7 and 8 by movement of the backing member 9.

Two diametrically opposed projecting parts 2 are formed on a circular frame member 1, the projecting parts 2 being provided with enlarged extremities 2a which are hollowed out to form cylinders 2b in which pistons 3 are adapted to slide. The pistons are provided with sealing rings 10 in order to form a sliding seal between each piston 3 and the wall of the cylinder 2b.

Non rotatable piston rods 4 are provided, these having heads 4a making an interference fit within recesses 3b of the pistons. A shank portion passes axially of the projecting part 2 and extends between the inner edge of disc 5 and outer edge of disc 6 and between pairs of inner and outer arcuate pads of friction material 7, 8 which are located on either side of the discs 5, 6. The friction pads 7, 8 are composed of adjacent arcuate pads, pads 7 being the inner ones and pads 8 the outer ones.

A dust cover 14 is made of spring material and suitably dished so as to act as a return spring for the piston and rod and to this end bears upon the piston end.

One pair of inner and outer pads 7, 8, of friction material is secured to the frame 1 and the other pair to a backing member 9. The backing member 9 has a central aperture 9a through which the non-rotatable piston rod 4 passes and a recess within which is accommodated a nut 11. The end of the piston rod is screw threaded, as shown at 4c, to engage with similar threads formed in nut 11, the threads preferably having a quick pitch, as shown in Fig. 2. The backing member 9 and nut 11 together form a pressure member exerting pressure on the disc and pad when friction pad 3 is forced outwardly of its cylinder.

The nut 11 is a circular member and is capable of rotary movement within its recess formed in the backing member 9. A spiral spring 12 is disposed with one end inserted within a slot in the nut and the other to a pin 13 fixed to the backing member 9 (Fig. 2). Before securing the end to the pin 13 the spring is tensioned by winding it round the nut. Looking at the device as represented in Fig. 1, the nut has a tendency to rotate in a clock-wise direction and draw the backing member and piston together so as to reduce any clearance space between the working parts. As the backing member and piston are drawn toward each other, the piston pads 7 and 8 are brought into contact with the brake disc 6 and the piston 3 is brought to rest against projections 13a, which act as means to stop the piston at a fixed position of rest and to provide spaces 13b into which actuating fluid may be admitted to move the piston from the position of rest.

From the above it will be seen that when fluid pressure is applied to the space 2d between the piston 3 and cylinder 2b for the purpose of applying the brake, the piston will commence to move away from the cylinder and exert a pull upon the rod 4 thus causing the friction pads 7 and 8 to press upon the discs 5, 6.

As the friction pads 7 and 8 wear down the nut 11 is tightened up by the spring 12 so as to reduce the clearance between the movable parts. The tension of the spring will be very small so that the friction pads will contact the discs very lightly and with little or no substantial friction until pressure fluid is applied to the cylinder. Rotation of each member 9 is prevented by two pins 9b, shown in Fig. 1, each having one end secured to said member and extending parallel and on opposite sides of the rod 4 between the discs 5 and 6. The free end of each pin is slidably fitted in an axially extending hole in the face of the torque member 2. The rod 4 is in frictional contact with the sealing members and this frictional contact prevents it from turning. The nut will rotate on the threaded end of the rod 4 until stopped by engagement with the member 9 because the friction of rod 4 in contact with the supporting parts 2 and 3 is sufficient to resist the turning by reaction of the nut 11. Similarly the member 9 is in frictional engagement wtih pads 7 which prevents its turning. It will, of course, be understood that the force exerted by the spring 12 is a very light one and not sufficient to overcome these frictional resistances.

In a slightly modified form illustrated in Fig. 3 the end of the non-rotatable rod 4 is extended beyond the nut 11 by a portion 4b which is provided with a slot into which the inner end of the spring 12 is inserted, the outer end being secured to a pin 13 which is secured in the nut.

In the embodiment of Fig. 4 (wherein only essential features are shown) the non-rotatable piston rod 4 makes an interference fit with a hole through the backing member 9 and is reversed so that its head 4a now bears against the backing member 9 whilst at its other end it extends through the piston 3a and terminates in a screw-threaded portion 4c, which engages with the nut 11a. The latter is suitably rounded on its top surface so as to fit within the curved surface of the spring cover member 14. A clock type of spring 12 has its outer end secured by a pin 13 to the cover 14 whilst the inner end is secured in a slot (not shown) in the nut 11a, after the spring has been tensioned in the manner previously described, so as to cause the nut to take up any slack in the assembly.

In the embodiment of Fig. 5 the head 4a of the piston rod 4 is held against the piston top by the spring cover member 14, and the screw threaded part 4c of the piston rod end engages with similar threads formed directly in the backing member 9 which acts as the nut. The clock type spring 12 has its outer end secured by the pin 13 to the spring cover 14 whilst the inner spring end is secured in a slot (not shown) formed in the head portion 4a. The piston rod 4 is free to rotate relatively to the piston 3 so that as wear develops between the contacting parts the spring 12 by rotating the rod 4 will draw all of the operative elements together so as to reduce the clearance between them.

Having decribed my invention what I claim is:

1. A fluid operated spot-type disc brake assembly which comprises a cylinder, a piston movable in said cylinder, said cylinder having means to stop said piston in a fixed position of rest and to admit fluid to move said piston from said position of rest to apply the brakes, an annular brake disc, a pair of axially aligned arcuate friction pads, one adjacent each face of the disc, an axially aligned operating rod actuated by said piston and cylinder mechanism having a screw threaded tail portion, a non-rotatable backing member associated with said rod and movable thereby to bring the friction pads and disc into frictional engagement, an adjusting nut rotatable on the threaded tail portion of said rod, and a clock-type spring co-axial with said rod having one end attached to a non-rotatable part of the brake assembly and the other end connected to said rod and nut assembly to rotate said nut relatively to said screw threaded tail portion to bring said friction pad into contact with said disc when said piston is in said fixed postion of rest.

2. The fluid operated spot-type disc brake assembly of claim 1 having a spring cover member closing one end of said cylinder and bearing against the piston to move said piston to said position of rest.

3. The fluid operated spot-type disc brake assembly of claim 1 in which the adjusting nut bears against the backing member and the clock-type spring is secured at one end to the backing member and at its other end to the nut.

4. The fluid operated spot-type disc brake assembly of claim 1 in which said nut bears against said piston.

5. The fluid operated spot-type disc brake assembly of claim 1 in which said nut forms a part of the backing member and the clock-type spring is secured at one end to said rod and in which said rod is rotatable.

6. A fluid operated spot-type disc brake assembly which comprises a cylinder, a piston movable in said cylinder, said cylinder having means to stop said piston in a fixed position of rest and to admit fluid to move said piston from said position of rest to apply the brakes, a pair of radially spaced annular brake discs, each pair having a pad on each side of an associated disc, an axially aligned operating rod actuated by said piston and cylinder mechanism having a screw threaded tail portion, a non-rotatable backing member associated with said rod and movable thereby to bring the friction pads and discs into frictional engagement, an adjusting nut rotatable on the threaded tail portion of said rod, and a clock-type spring co-axial with said rod having one end attached to a non-rotatable part of the brake assembly and the other end connected to said rod and nut assembly to rotate said nut relatively to said screw threaded tail portion to bring said friction pad into contact with said discs when said piston is in said fixed position of rest.

HENRY JAMES BUTLER.

References Cited in the file of this patent

UNITED STATES PATENTS

| Number | Name | Date |
| --- | --- | --- |
| Re. 19,876 | Criley | Mar. 3, 1936 |
| 1,495,714 | Rath | May 27, 1924 |
| 1,585,309 | Monckmeier | May 18, 1926 |
| 2,160,752 | Oliver | May 30, 1939 |
| 2,196,799 | Keplinger | Apr. 9, 1940 |
| 2,279,251 | Scott-Iversen | Apr. 7, 1942 |
| 2,366,093 | Forbes | Dec. 26, 1944 |
| 2,371,554 | Scott-Iversen | Mar. 13, 1945 |
| 2,376,685 | Goepfrich | May 22, 1945 |
| 2,419,113 | Bricker | Apr. 15, 1947 |
| 2,497,438 | Butler | Feb. 14, 1950 |

FOREIGN PATENTS

| Number | Country | Date |
| --- | --- | --- |
| 324,793 | Italy | Feb. 16, 1935 |